United States Patent [19]

Petzold et al.

[11] Patent Number: 4,982,822
[45] Date of Patent: Jan. 8, 1991

[54] CONTROL SYSTEM FOR CONTROLLING THE LINE PRESSURE IN A CONTINUOUSLY VARIABLE TRANSMISSION

[75] Inventors: Werner P. Petzold, Harwood Heights, Ill.; William P. Umlauf, Schererville, Ind.

[73] Assignee: Borg-Warner Corporation, Chicago, Ill.

[21] Appl. No.: 936,527

[22] Filed: Dec. 1, 1986

[51] Int. Cl.$^5$ ............................................. B60K 41/22
[52] U.S. Cl. ..................................... 192/3.58; 74/866; 474/28; 364/424.1
[58] Field of Search .................. 192/3.58, 0.092, 0.048; 74/866, 867; 364/424.1; 474/12, 18, 28

[56] References Cited

U.S. PATENT DOCUMENTS

| | | | |
|---|---|---|---|
| 4,458,318 | 7/1984 | Smit et al. | 364/424.1 |
| 4,462,275 | 7/1984 | Mohl et al. | 74/866 |
| 4,631,043 | 12/1986 | Tokoro et al. | 474/18 |
| 4,648,496 | 3/1987 | Petzold et al. | 192/0.076 |

FOREIGN PATENT DOCUMENTS

| | | | |
|---|---|---|---|
| 139277 | 5/1985 | European Pat. Off. | 364/424.1 |
| 196807 | 10/1986 | European Pat. Off. | 74/866 |

Primary Examiner—Richard M. Lorence
Attorney, Agent, or Firm—Neuman, Williams et al.

[57] ABSTRACT

A pressure transducer, which senses clutch pressure and effects closed loop clutch control in a continuously variable transmission, is used after the clutch is fully engaged to provide closed loop line pressure control to a desired setpoint, which line pressure regulates the tension on the belt in the transmission. Only a single transducer is needed since there is a known relationship between the clutch and line pressures when the clutch is locked up. Prior to lockup, the line pressure is governed by an open loop controller which establishes the line pressure at a level higher than that called for by the setpoint. This ensures that the line pressure will be high enough to provide the required tension on the belt so that it will not slip. After the clutch is engaged, the closed loop line pressure controller (which includes both the open loop line pressure controller and the closed loop clutch controller) establishes the line pressure at the setpoint. For stable operation, the closed loop controller responds only to relatively slow changes of the setpoint. In response to fast changes, the closed loop controller is made ineffective so that the line pressure will be determined only by the open loop controller and will be greater than the level called for by the setpoint.

20 Claims, 9 Drawing Sheets

CONTROL SYSTEM FOR CONTROLLING THE LINE PRESSURE IN A CONTINUOUSLY VARIABLE TRANSMISSION

BACKGROUND OF THE INVENTION

This invention is directed to a line pressure control system for a continuously variable transmission (CVT). Such a transmission includes fluid-actuated primary and secondary pulleys intercoupled by a flexible belt, the effective diameters of the pulleys being varied simultaneously but in opposite directions to effect a smooth, continuous change in the drive ratio between an input driving shaft and an output driven shaft. The first (primary) pulley is usually controlled by fluid under pressure to regulate the effective drive ratio of the transmission, while the secondary pulley is supplied with fluid at a pressure sufficient to prevent slippage of the belt in order to transfer torque from the primary pulley to the secondary pulley. A fluid-actuated clutch is generally employed to transfer drive torque from the transmission (namely, from the secondary pulley) to an associated driveline. The line pressure is the highest pressure in the CVT and is that which is applied to the secondary pulley to ensure an adequate clamping force and tension on the belt so that it will not slip.

Various systems have been developed for controlling the different hydraulic pressures required to operate a CVT, such as those systems described in copending U.S. patent applications Ser. Nos. 717,913 and 722,578, filed on Mar. 29, 1985 and Apr. 12, 1985, now U.S. Pat. Nos. 4,718,308 and 4,648,496 respectively, and assigned to the present assignee, and also in the various references mentioned in the copending applications. The present invention constitutes an improvement over those prior control systems in that more reliable operation is achieved, while at the same time employing a simpler and less expensive arrangement than that required in the prior systems. For example, in order to realize closed loop control of both the line (secondary) pressure and the clutch pressure in the past, two separate pressure transducers or sensors would be needed. This is accomplished in the present invention by means of only one such transducer.

As another example, if a closed loop line pressure controller does not respond fast enough to changes in a desired setpoint, the line pressure is likely to become less than the level desired and the belt could slip, causing damage to itself and the sheaves. This cannot occur in the present invention. In the event that the closed loop controller cannot keep up with the setpoint changes, an open loop controller takes over and ensures that the line pressure will always be greater than the level called for by the setpoint.

As a further example, this open loop controller makes use of a look-up table to control the line pressure. Typically this would require a large amount of stored data. In the case of the present invention, the amount of memory required is significantly reduced by the use of an interpolation algorithm.

SUMMARY OF THE INVENTION

The invention provides a line pressure control system for controlling the line fluid pressure in a continuously variable transmission, where fluid under line pressure is controlled to produce an adjustable clutch fluid pressure for operating a clutch to transfer drive torque from an engine and through the transmission to an associated driveline, where a pressure transducer senses the clutch pressure applied to the clutch, and where a closed loop clutch controller responds to the sensed clutch pressure to effect closed loop control of the clutch. The control system comprises a closed loop line pressure controller which responds to the clutch pressure, sensed by the pressure transducer after the clutch is fully applied and is locked up, and becomes operable to effect closed loop control of the line pressure to a desired setpoint.

In accordance with a more detailed aspect of the invention, a control system is provided for a continuously variable transmission having a primary pulley and a secondary pulley, a belt intercoupling the pulleys, a primary sheave chamber in the primary pulley for admitting and discharging fluid to change the effective pulley diameter and correspondingly change the transmission ratio, a secondary sheave chamber in the secondary pulley for admitting and discharging fluid to maintain tension in the belt as the transmission is driven, a fluid-actuated clutch operable to transfer drive torque from the secondary pulley to an associated drivetrain, which clutch includes a clutch chamber for receiving fluid to apply the clutch and from which fluid is discharged to release the clutch. The control system comprises means for supplying fluid under line pressure to the secondary sheave chamber. A closed loop clutch controller, including a pressure transducer, employs the fluid under line pressure to supply a controlled clutch fluid pressure to the clutch chamber, the pressure transducer sensing the clutch pressure and providing a feedback signal within the clutch controller. Control means are provided for responding to a desired line pressure setpoint and to the clutch pressure sensed by the pressure transducer, when the clutch is fully applied and is locked up, to effect closed loop control of the line pressure to the setpoint, the pressure transducer developing a feedback signal within the control means.

In accordance with another aspect, a line pressure control system is provided for controlling the line fluid pressure in a continuously variable transmission, where the line pressure is varied by a line pressure regulator which is controlled by a pulse width modulated signal having an adjustable duty cycle, the line pressure being determined by, and being directly proportional to, the signal's duty cycle, and where, due to undesired leakage and other effects in the regulator which vary directly with temperature, the duty cycle required to produce a desired line pressure depends on the temperature of the transmission fluid. The control system comprises means for effectively storing, in a look-up table, a duty cycle/desired setpoint segment curve for each of several different discrete temperatures. There are means for determining a duty cycle for the pulse width modulated signal, which means selects the two temperature curves bracketing the current fluid temperature, calculates the resultant duty cycles, and selects the larger of the two duty cycles, thereby to provide a line pressure that will always be higher than a desired setpoint pressure.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like components, and in which:

GENERAL SYSTEM DESCRIPTION

Figure 1:
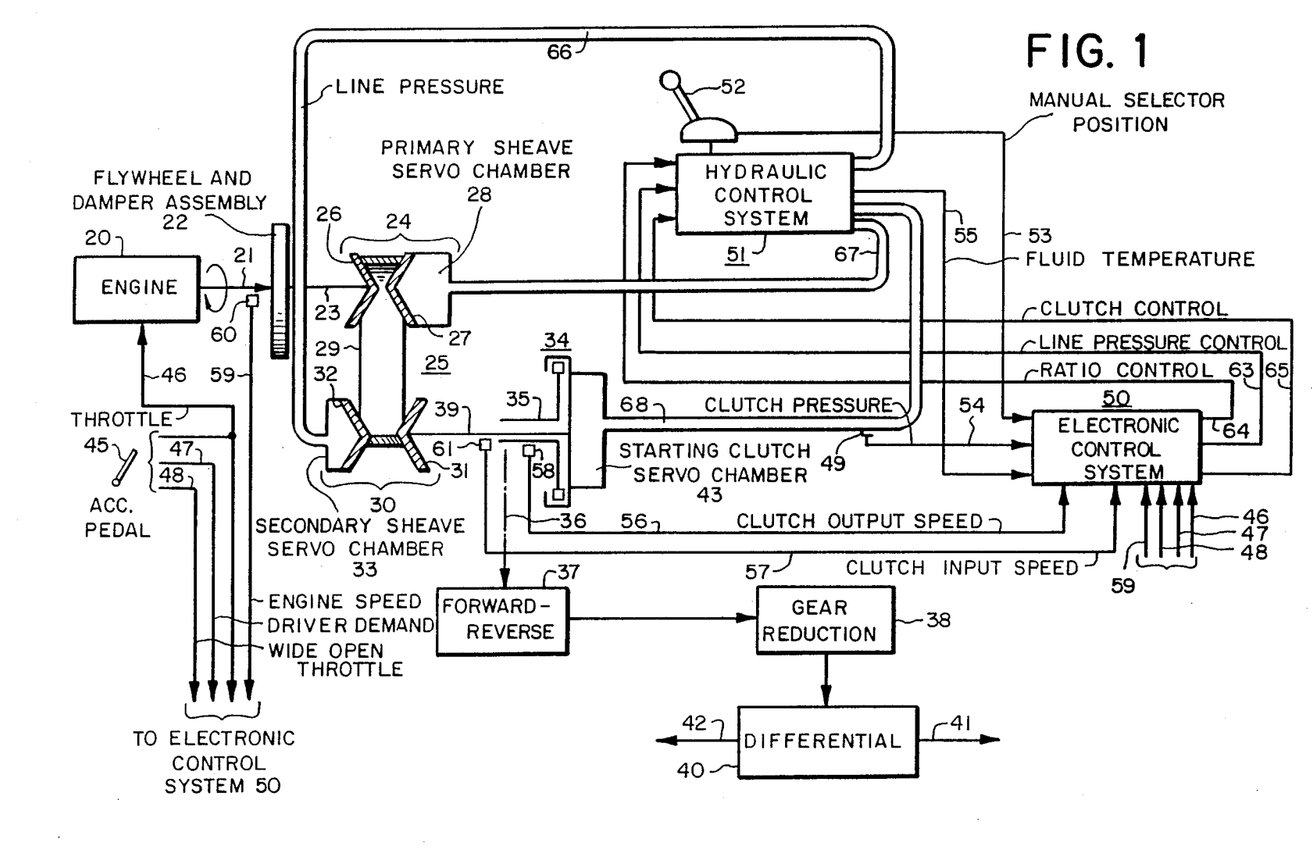
FIG. 1 is a block diagram of a continuously variable transmission having a closed loop clutch controller and a line pressure control system, which includes a closed loop line pressure controller, constructed in accordance with the invention.

The system, as shown in FIG. 1, contains many components that are illustrated and described in much greater detail in the aforementioned United States copending patent applications and in the references cited in the applications. Since those details are not needed to explain the present invention, and would only encumber the application, they are not shown. The teachings of those prior disclosures are incorporated herein by reference. Referring now to FIG. 1, the general power flow in an automotive layout is shown from an engine 20 over a shaft 21, flywheel-and-damper assembly 22 and transmission input shaft 23 to drive primary pulley 24 of a continuously variable transmission 25. Input or primary pulley 24 has a fixed sheave 26 and a movable sheave 27, with a primary sheave servo chamber 28 positioned to admit and discharge fluid and thus adjust the position of movable sheave 27. Secondary or output pulley 30 has an axially fixed sheave 31 and an axially movable sheave 32, with a secondary sheave servo chamber 33 positioned to admit and discharge fluid to change the effective diameter of pulley 30. A belt 29 of metal or suitable elastomeric material intercouples pulleys 24 and 30. The output of secondary pulley 30 is supplied over shaft 39, in turn coupled to one side of clutch 34, the other side of which is coupled to a sleeve or quill shaft 35. Drive from this shaft is translated over a gear set (not shown) represented by dash-dot construction line 36 to a forward-reverse gear selector assembly 37. Drive is passed from this selector assembly through a gear reduction stage 38 to a differential assembly 40, which passes output drive over shafts 41, 42 to the wheels (not shown) of the vehicle in which the control system of the invention is mounted. This drivetrain, from engine 20 to shafts 41, 42, is completed when transmission fluid under pressure is admitted into starting clutch servo chamber 43.

Certain electrical signals are derived from the position of an accelerator pedal 45, and passed over a plurality of electrical conductors 46, 47 and 48 to an electronic control system 50. The throttle signal on line 46 is a function of the position of pedal 45. The driver demand signal on line 47 changes state as soon as pedal 45 is displaced from its at-rest position. The wide open throttle (WOT) signal on line 48 changes state when pedal 45 reaches the end of its travel. Electronic control system 50 operates jointly with a hydraulic control system 51 to regulate transmission operation and control engine operation.

A manual selector lever 52 shown adjacent hydraulic control system 51 operates both to actuate certain components in system 51 and to send a signal denoting the position of lever 52 over line 53 to electronic control system 50. Preferably, the signal on line 53 is electronic but of course it can be mechanical or fluidic if desired. Another signal, indicating pressure in the clutch fluid line in hydraulic control system 51, is supplied from pressure transducer 49 and over line 54 to the electronic control system 50. A signal representing the temperature of the transmission fluid is passed from hydraulic control system 51 over line 55 to electronic control system 50. Other input signals to the electronic control system are provided over conductors 56, 57 and 59. A conventional position sensor 60 is located adjacent to engine output shaft 21, to provide on line 59 a signal which varies as the engine speed. Because of the solid coupling through the flywheel-and-damper assembly to input pulley 24, the signal on line 59 can also be considered to represent the transmission input speed. Another sensor 61 is positioned adjacent shaft 39 to provide on line 57 a clutch input speed signal. A third sensor 58 is positioned adjacent to clutch output shaft 35 to provide on line 56 a clutch output speed signal, denoting the speed of the transmission output shaft 39. This signal on line 56 can function as a vehicle speed signal, as there is no slip in the driveline beyond the clutch. Of course, sensor 58 can be positioned anywhere between sleeve shaft 35 and driveshafts 41, 42 to provide the vehicle speed signal. After operating on these several input signals, electronic control system 50 provides three pulse width modulated (PWM) control signals on lines 63, 64 and 65 for application to hydraulic control system 51. The PWM signal on line 63 is a control signal to regulate the line pressure produced by a pump assembly within the hydraulic control system. The output PWM signal on line 64 is a ratio control signal, used to establish the desired ratio of CVT 25. The third output PWM signal, on line 65, is used to regulate operation of clutch 34. Hydraulic control system 51 passes fluid under line pressure through conduit 66 to secondary sheave servo chamber 33 to hold the proper tension in belt 29 so that it will not slip. The hydraulic control system provides the appropriate fluid pressure through line 67 to primary sheave servo chamber 28 to govern ratio changes, or to maintain a steady ratio, of CVT 25. In addition, a third fluid signal is provided through conduit 68 to clutch servo chamber 43 to apply the clutch and complete the transfer of power through the drivetrain as described above, and to effect release of the clutch to interrupt the power flow.

DETAILED DESCRIPTION OF THE INVENTION

Figure 2:
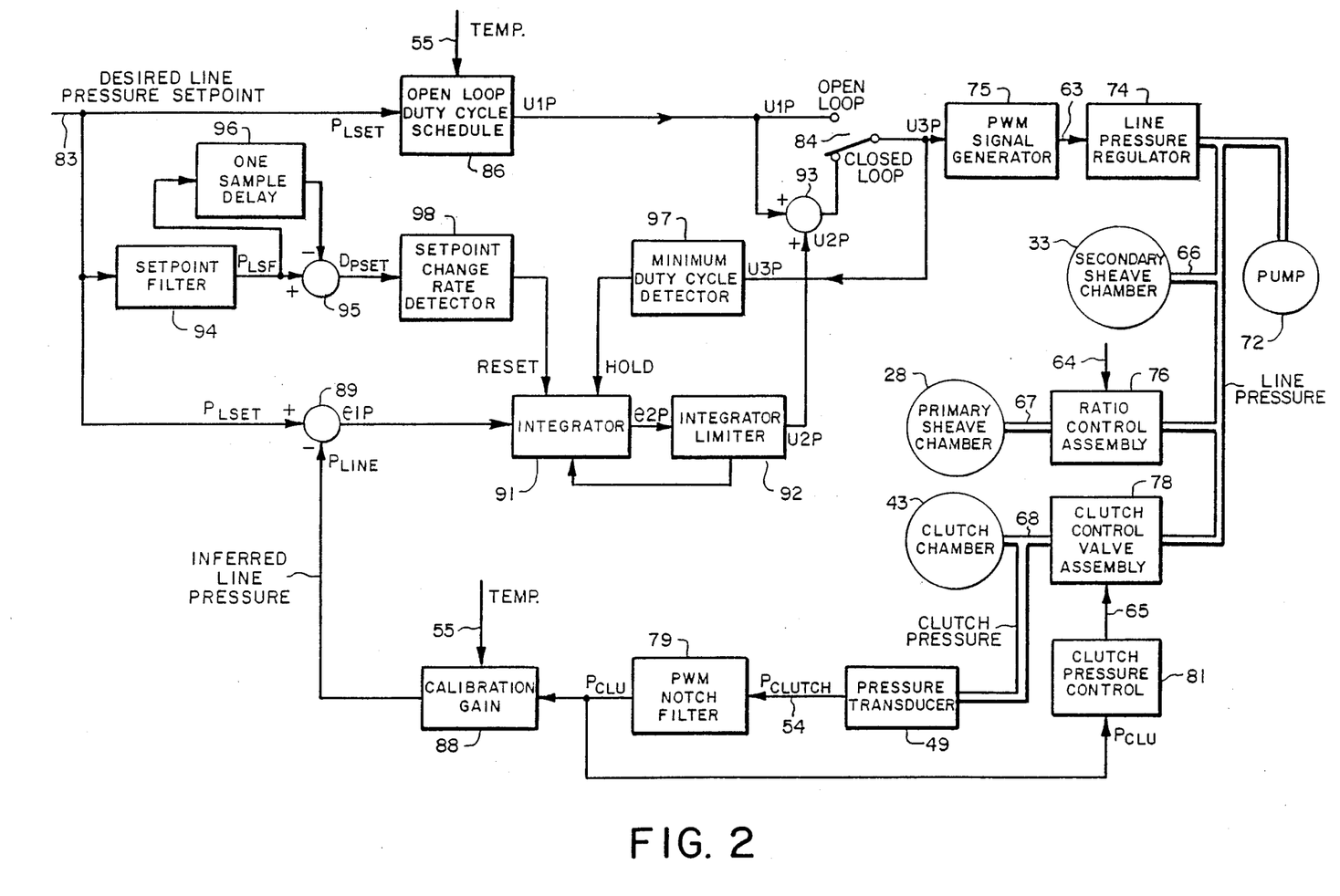
FIG. 2 is a functional block diagram or schematic showing the clutch controller and the line pressure control system in greater detail.

The portions of FIG. 1, which are included in the invention, are shown in greater detail by the functional blocks in FIG. 2. Those skilled in the art will understand that some of the components of FIG. 2 are provided to illustrate the control and information flow in the present invention, and do not necessarily indicate that a particular item is implemented in hardware if it is shown, for example, as a switch or as a stage for providing a given result or as an element for performing a certain function. Preferably, electronic control system 50 in FIG. 1 includes microcomputer circuitry and many of the functions indicated by the blocks in FIG. 2 are implemented in software and are performed by the microcomputer circuitry.

Referring to FIG. 2, transmission fluid at a relatively high pressure, produced by the engine-driven pump 72, is varied by line pressure regulator 74, which acts as a shunt regulator, to provide a controlled line pressure. The operation of regulator 74, shown in detail in the aforementioned copending U.S. patent application Ser. No. 717,913, is governed by the duty cycle of the pulse width modulated signal developed by PWM signal generator 75 and applied over line 63 the line pressure being directly proportional to the signal's duty cycle. The manner in which the duty cycle is selected, thereby determining the line pressure, will be described later. The fluid under line pressure is supplied over line 66 to the secondary sheave chamber 33 to maintain tension in the belt as the transmission is driven. Ratio control assembly 76, illustrated in detail in copending U.S. patent application Ser. No. 717,913, receives a pulse width modulated signal over line 64 from the electronic control system and provides a regulated flow of pressurized fluid in the line 67 to primary sheave chamber 28 to establish a desired transmission ratio, and likewise is used to exhaust the fluid from that chamber if necessary to change the ratio to a new desired value.

Clutch control valve assembly 78, shown in copending U.S. patent applications Ser. Nos. 717,913 and 722,578, receives an input pulse width modulated signal over line 65 and in response to that signal provides pressurized fluid over line 68 into and out of clutch chamber 43. A closed loop clutch controller is provided for employing the fluid under line pressure to supply a controlled clutch fluid pressure to chamber 43. Such a closed loop controller is shown in detail in the prior copending patent applications and is illustrated in FIGURE 2 by means of pressure transducer 49, line 54, PWM notch filter 79 and clutch pressure control 81. As described in the prior disclosures, the line pressure, at the inlet of clutch control valve assembly 78, is adjusted as necessary to produce a clutch pressure that will slip, engage or disengage the clutch as desired. Transducer 49 senses the clutch pressure to provide on line 54 an electrical signal ($P_{CLUTCH}$) representing that pressure. Filter 79 removes the PWM frequency (preferably around 100 hertz) from the $P_{CLUTCH}$ signal to produce a signal ($P_{CLU}$) which is fed back to control 81 to effect the desired clutch actuation. It is to be noted at this point that the clutch and line pressures will differ substantially when the clutch is either disengaged or is slipping. However, when the clutch is fully engaged and locked up (the clutch control valve thereby being opened up fully to the line pressure), the clutch pressure will be tied to, but will be lower than, the line pressure, the difference being due to a relatively small pressure drop through the clutch control valve which is caused by leakage. Hence, when the clutch is locked up the output of pressure transducer 49 may be employed to determine the line pressure and, in a manner to be explained, may be used to effect closed loop line pressure control.

Considering now the operation of the line pressure control system, the electronic control system provides on line 83 a signal representing the desired line pressure setpoint, namely the line pressure that should be applied to secondary sheave chamber 33 at any given time to ensure that the CVT belt will be adequately tensioned and will not slip, and yet will not be so high that the efficiency will suffer. As is well known, this line pressure setpoint is a function of the engine torque and the transmission ratio that should be maintained by the belt. The engine torque is calculated from an engine map which is stored in the electronic control system, the map effectively having a series of throttle setting curves on a plane where the engine speed can be the abscissa or ordinate, and where the engine torque is represented on the other reference scale or axis. In this way, since the engine speed and throttle setting are always monitored, those two parameters can be employed to determine from the map the torque produced by the engine. The belt ratio is determined by the engine speed and the clutch input speed.

The line pressure control system essentially comprises two separate controllers, an open loop controller and a closed loop controller, each of which responds to the desired setpoint on line 83. Until the clutch is fully engaged and locked up, the closed loop line pressure controller is effectively inoperable and only the open loop controller is functional. Hence, during the start mode, for example, when the clutch is slipping, the line pressure is controlled only by the open loop controller. Clutch lockup can be determined, and logic switch 84 may be controlled, by comparing the clutch input and output speeds. Until they are equal, only the open loop controller is operable and switch 84 is in its position opposite to that shown in FIGURE 2. During the open loop mode the setpoint on line 83 along with the signal on line 55 representing the sensed fluid temperature are employed in block 86 to select a duty cycle for the pulse width modulated signal produced by generator 75 that will result in a line pressure at least equal to that called for by the setpoint. During this open loop operating mode, signal U1P and signal U3P will be equal. The function of block 86 will be described in greater detail later. In general, the open loop duty cycle is determined by utilizing a look-up table which makes a linear interpolation as a function of pressure setpoint and temperature. The table is biased to always yield a higher pressure than that commanded by the setpoint. This is done to make certain that sufficient pressure is always delivered to the secondary sheave chamber 33, thereby avoiding damage to the belt and the sheaves. The open loop duty cycle is selected as a function of fluid temperature to compensate for undesired leakage and other temperature variations in regulator 74 and thus achieve the desired accuracy during open loop control. Hence, as the temperature increases the duty cycle must likewise increase in order to compensate for the characteristics of the regulator and maintain a given line pressure, thereby effectively rendering the line pressure immune to temperature changes. Since, in the open loop line pressure controller, there is no way of knowing the actual line pressure applied to chamber 33, it is particularly important as a safety measure to select a duty cycle that will result in a line pressure higher than necessary so that the belt will always be properly tensioned and n damage will be suffered by the belt or sheaves. Making the line pressure greater than necessary during the open loop mode results in a minimal loss of efficiency since the intervals in which the clutch is not fully applied are relatively short.

Once the clutch is locked up (which occurs, for example, when the transmission is in the drive mode), the clutch input and output speeds will be equal and logic switch 84 will be repositioned to the position shown in the drawing. At this time, the clutch pressure sensed by transducer 49 can be used to determine the actual line pressure since those pressures differ only by the pressure drop in the clutch control valve assembly. This pressure drop stems from undesired leakage and is directly proportional to the fluid temperature. The clutch pressure signal $P_{CLU}$ therefore cannot be used directly to close the loop, but must first be multiplied by a calibration gain (block 88) which is obtained experimentally and is a function of temperature. The calibration gain function 88 will be discussed later in more detail. In effect, calibration gain 88 converts the clutch pressure signal $P_{CLU}$ to an inferred line pressure signal $P_{LINE}$ which represents the actual line pressure. The closed loop line pressure controller now closes around the feedback signal $P_{LINE}$ to effect closed loop control of the line pressure to the desired setpoint.

To explain, signals $P_{LSET}$ and $P_{LINE}$ are applied to a summer 89 and since the line pressure established by the open loop controller is usually greater than the setpoint pressure, a negative error signal e1P will be produced by the summer and applied to integrator 91. The output signal e2P of the integrator thereupon ramps down (namely, slowly decreases in a negative direction) to apply a negative-going signal U2P to one input of summer 93, the other input of which receives signal U1P. Signal U3P will thus be decreased to lower the duty cycle of the pulse width modulated signal applied to regulator 74, as a consequence of which the line pressure drops to the level called for by the setpoint. As the line pressure is reduced to the setpoint, signal $P_{LINE}$ decreases until it equals $P_{LSET}$ at which time error signal e1P becomes zero and the output signal e2P of the integrator will hold and remain constant at the level attained when the error signal reached zero. Assume, for example, that the desired setpoint is 150 psi and that the open loop duty cycle schedule 86 produces a signal U1P resulting in a pressure of 170 psi. An error of minus 20 psi would therefore be represented by signal e1P and integrator 91 would ramp down, causing signal U2P to decrease. The sum of U1P and U2P now becomes a number less than U1P and U3P decreases until the line pressure drops to 150 psi, at which time the integrator holds signal U2P constant. Of course, this closed loop line pressure controller operates automatically in response to dynamic changes to maintain the line pressure at the setpoint.

Integrator limiter 92 prevents the amplitude of signal e2P from going too high or too low. Assume there is no limiter and for some reason the system is out of control. Assume, for example, that the setpoint calls for a line pressure of 200 psi, but the engine speed is low and the pump 72 is not turning very fast, as a result of which it is not possible to build up to 200 psi. The control loop would attempt to increase the duty cycle and the integrator would reach a maximum output amplitude. If the system is then brought back under control the integrator output would be very high and a relatively long time would be required to bring it back into the control range. Hence, by means of limiter 92 it is possible to effectively permit the integrator to move only over the range employed in normal operation.

Of course, as operating conditions change, such as throttle setting, engine speed and clutch input speed, the engine torque and belt ratio will vary, requiring a different desired line pressure setpoint on line 83. The line pressure control system of the invention will respond to and follow those setpoint changes so that the line pressure will always be at least as high as desired. In some applications of the invention, for optimum stability it may be desired to limit the speed at which the closed loop line pressure controller operates so that it will be a slow responding loop. For example, if the location of pressure transducer 49 is physically separated from secondary sheave chamber 33 by a substantial distance, there may be dynamic effects to which no response should be made. The pressure transducer may sense dynamic changes that do not appear in the pressurized fluid supplied to the secondary sheave chamber. Accordingly, operating stability may be maximized by constructing the closed loop controller so that it responds only to relatively slow changes. This is most conveniently achieved by adjusting the gain of integrator 91. In other words, the gain of the integrator may be selected to obtain a desired closed loop response.

Unfortunately, if the operation of the closed loop line pressure controller is purposely slowed down, it will not respond to relatively fast changes of the desired setpoint and the line pressure would not keep up with torque changes in the system. Assume, for example, that the driver of the vehicle in which the transmission is installed actuates the throttle quickly causing the engine torque to suddenly increase. The line pressure control must be capable of following that torque increase, which increases the setpoint, and increases the line pressure to prevent the belt from slipping in response to the higher torque. However, if the closed loop controller is a slow response loop, that quick change may not be followed.

This problem is overcome by rendering the closed loop controller ineffective in response to relatively fast changes of the setpoint so that the line pressure will be determined only by the open loop controller and will be greater than the level dictated by the setpoint. This is achieved by resetting the integrator in the closed loop controller according to the following algorithm. The signal $P_{LSET}$ is applied to first-order setpoint filter 94 to eliminate undesired noise. Since the line pressure setpoint is determined from actual system measurements, namely engine speed, throttle position, and clutch input speed, a filter is needed for noise immunity. The noise-deleted output signal $P_{LSF}$ of filter 94 is applied directly to one of the inputs of summer 95 and through a one sample delay 96 to the summer's other input. These functions are best implemented in software and will be described later in connection with the logic flow chart of FIG. 3. In brief, summer 95 receives the current value of signal $P_{LSF}$ and a previous value and effectively subtracts one value from the other to produce a difference signal $D_{PSET}$ whose magnitude represents the speed at which the line pressure setpoint is varying. Signal $D_{PSET}$ goes in a positive direction when $P_{LSET}$ increases and in a negative direction when $P_{LSET}$ drops. Setpoint change rate detector 98 responds to signal $D_{PSET}$ and effectively determines whether the setpoint is changing so fast that the closed loop controller cannot keep up with it. If, for example, the setpoint is increasing faster than some predetermined rate, which is faster than the response of the control loop, this fact will be detected by detector 98. When the rate at which the setpoint is changing is too fast, detector 98 resets integrator 91 which forces the integrator to output a zero signal thereby effectively disabling or turning off the closed loop line pressure controller. When this occurs the line pressure is governed only by the open loop duty cycle schedule 86, as a consequence of which the line pressure will always be more than that called for by the changing setpoint and the belt will be prevented from slipping. Of course, the function of block 86 will be performed fast enough to follow the setpoint variations. Following a sudden setpoint change which triggers the system into its open loop mode, the two input signals to summer 95 will again become substantially equal and the reset will be removed from integrator 91, allowing the closed loop controller to return to normal operation.

The invention also features a hold control on integrator 91 when the line pressure drops to some predetermined minimum level. This is desirable because of the characteristics of the particular regulator used in the illustrated embodiment, which regulator is preferably designed to always provide a minimum line pressure even in the event of an electrical failure. When the duty cycle of the pulse width modulated signal is at a given minimum value, such as 20%, regulator 74 will produce its minimum pressure even though the duty cycle may change below the minimum level. The duty cycle has to be increased above 20% before the pressure will increase from the minimum. When the duty cycle, imposed on the PWM signal applied over line 63 to regulator 74, is less than 20% the system is really out of control and the integrator should not function. The integrator is prevented from integrating by minimum duty cycle detector 97 which effectively compares the duty cycle, represented by signal U3P, with a predetermined minimum duty cycle, and if the U3P duty cycle is less than the minimum the output signal e2P of integrator 91 is held at its previous level. Holding of the output may be achieved by forcing signal e1P to be zero.

The desirability of this feature may best be appreciated by considering an example. Assume that the line pressure setpoint is calling for 60 psi and by the nature of the regulator design the minimum pressure is 70 psi even with 0% duty cycle. In this case there will be an error signal that the integrator will try to integrate to keep lowering the U3P duty cycle. No matter how far the duty cycle is lowered the line pressure will still be 70 psi, even though only 60 psi is wanted. Detector 97 will "look" at the U3P duty cycle and if it is less than, for example, 20% the detector will just hold the integrator. This serves a function similar to that served by integrator limiter 92. When the system is out of control the integrator is stopped so that it does not run away.

Figure 3A:
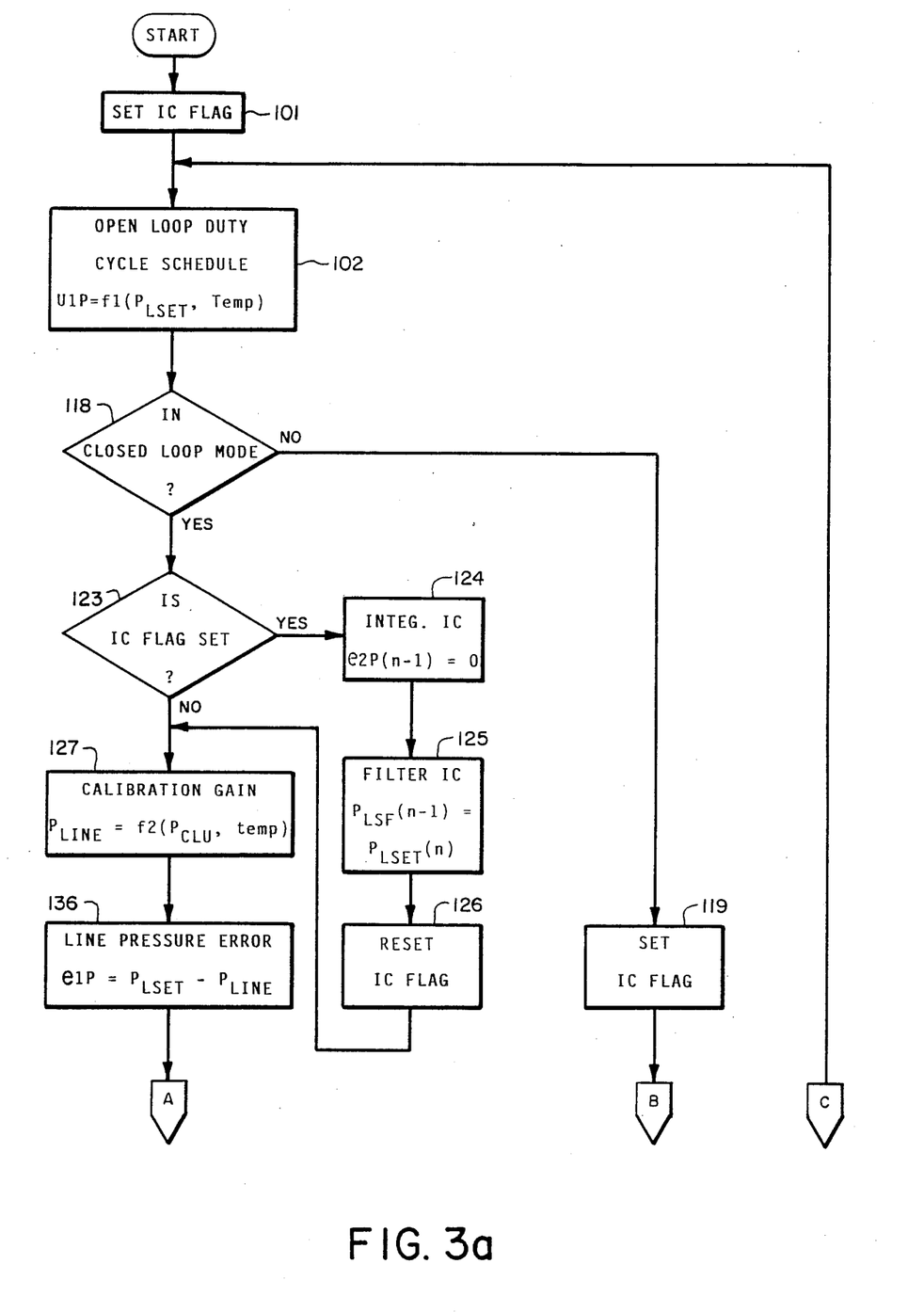
FIGS. 3a, 3b, 3c, 4 and 6 are logic flow charts illustrating the sequence of operations and decisions which occur in operating the control system and will be helpful in understanding the invention.
Figure 3B:
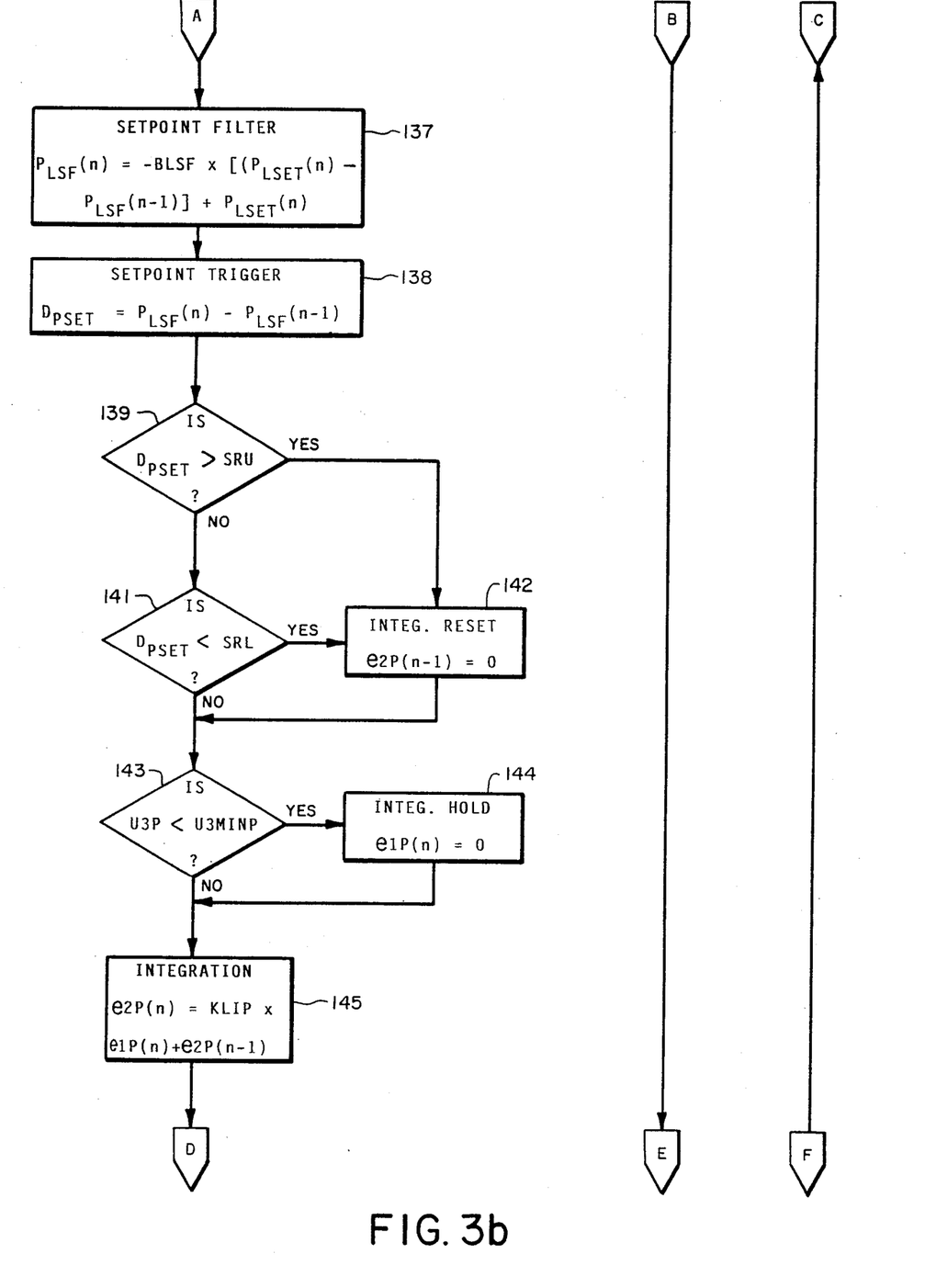
Figure 3C:
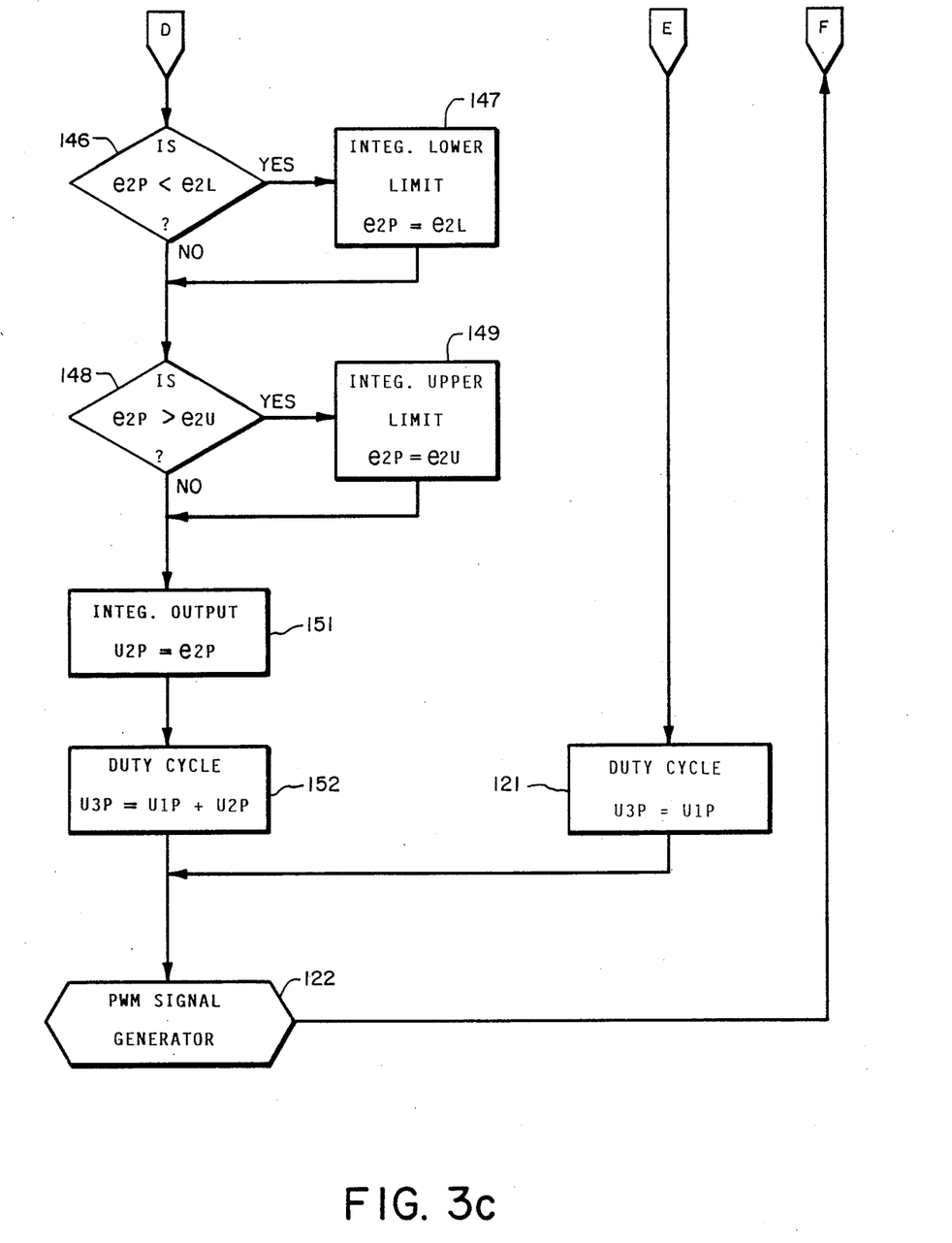
Figure 4:
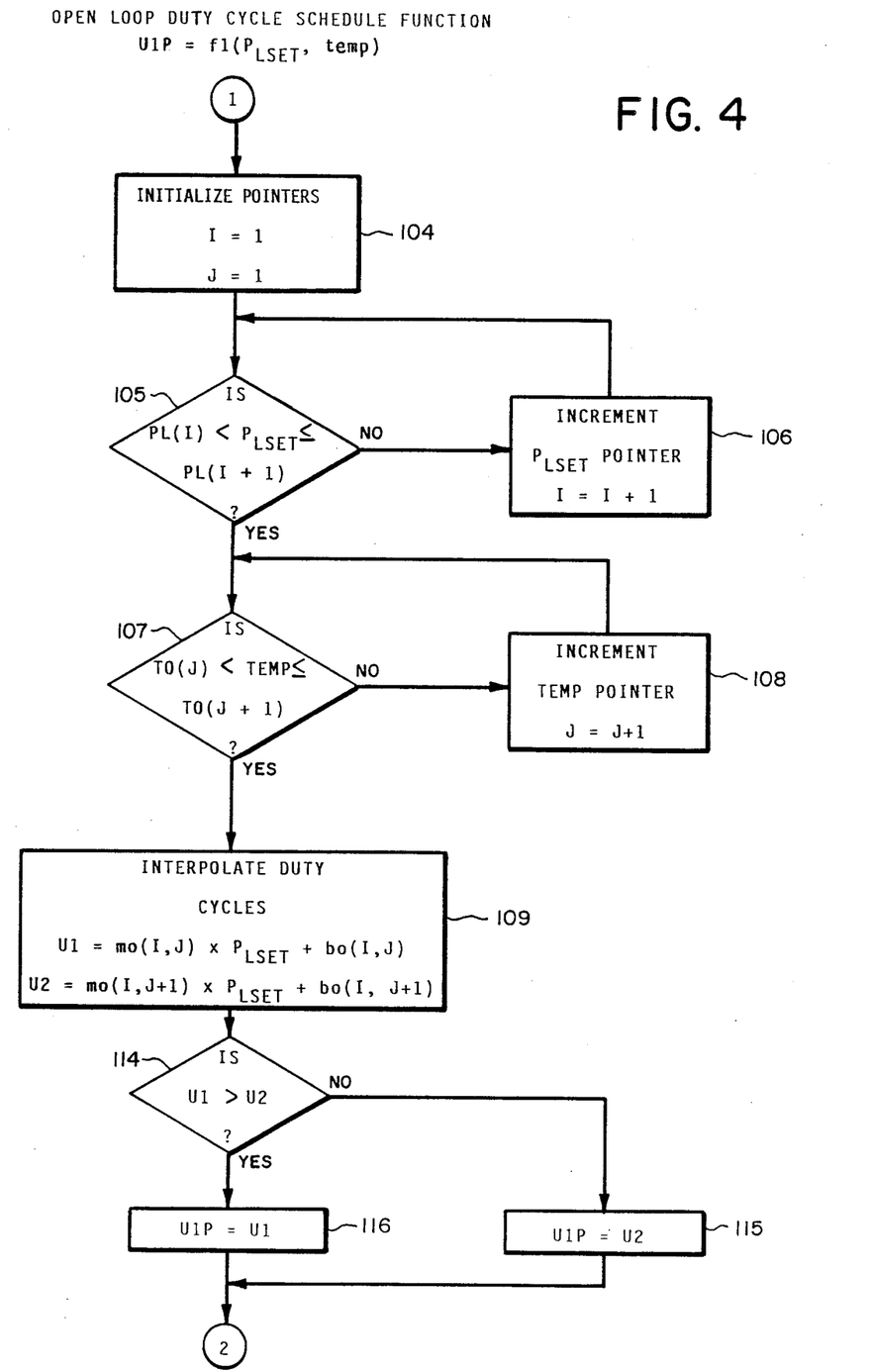
Figure 5:
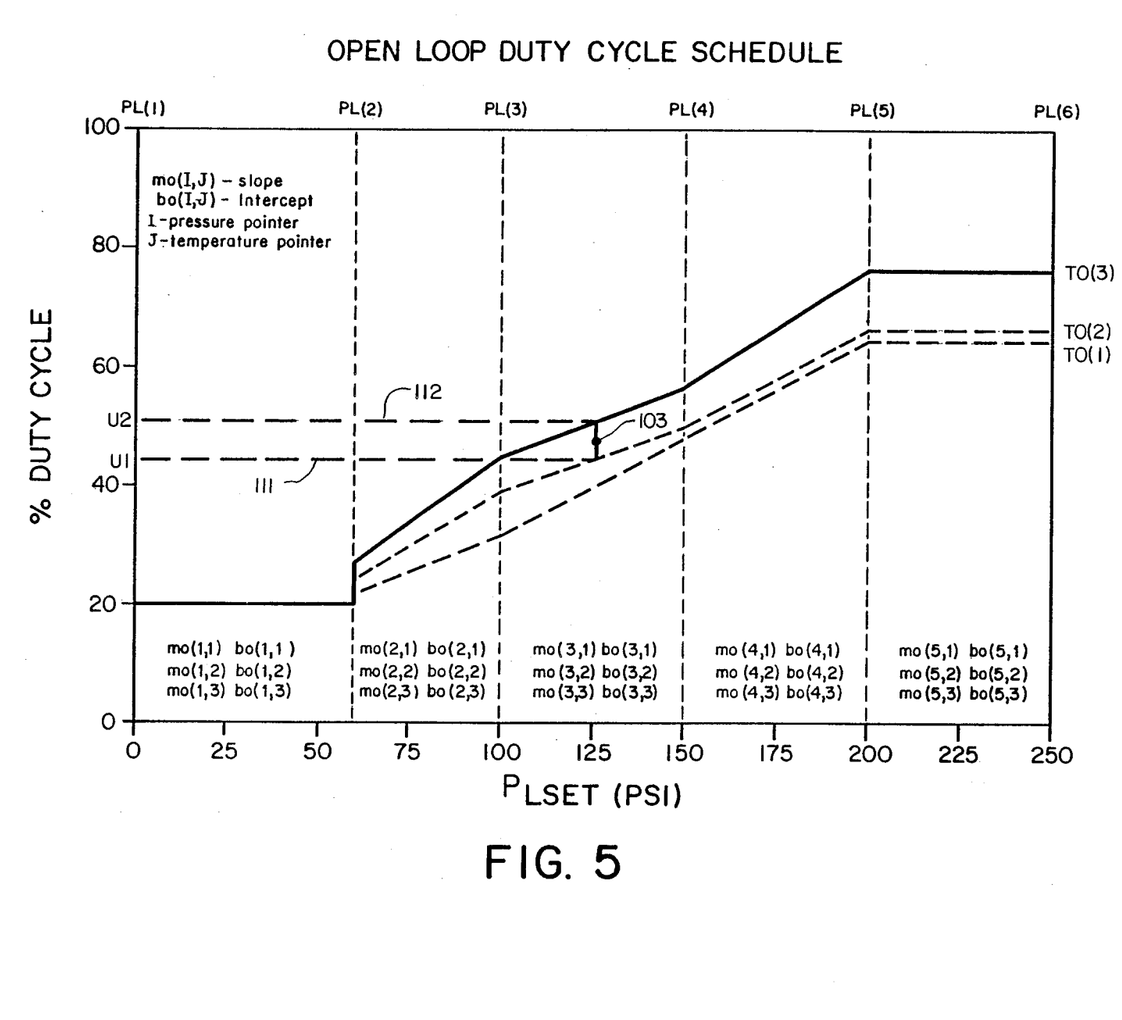
FIGS. 5 and 7 disclose segment curves that are stored in look-up tables in the control system and will be useful in explaining the flow charts of FIGURES and 6.
Figure 6:
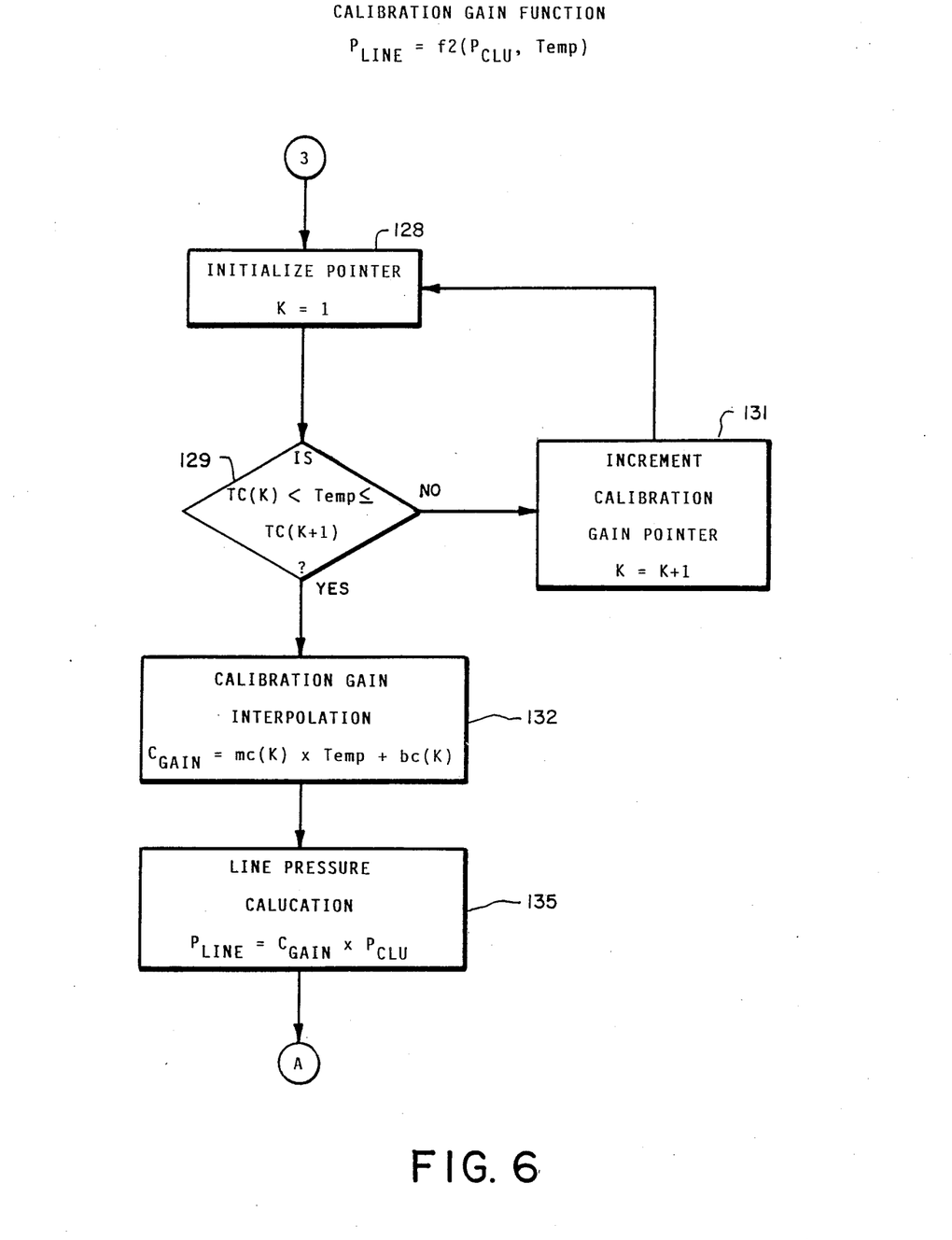
Figure 7:
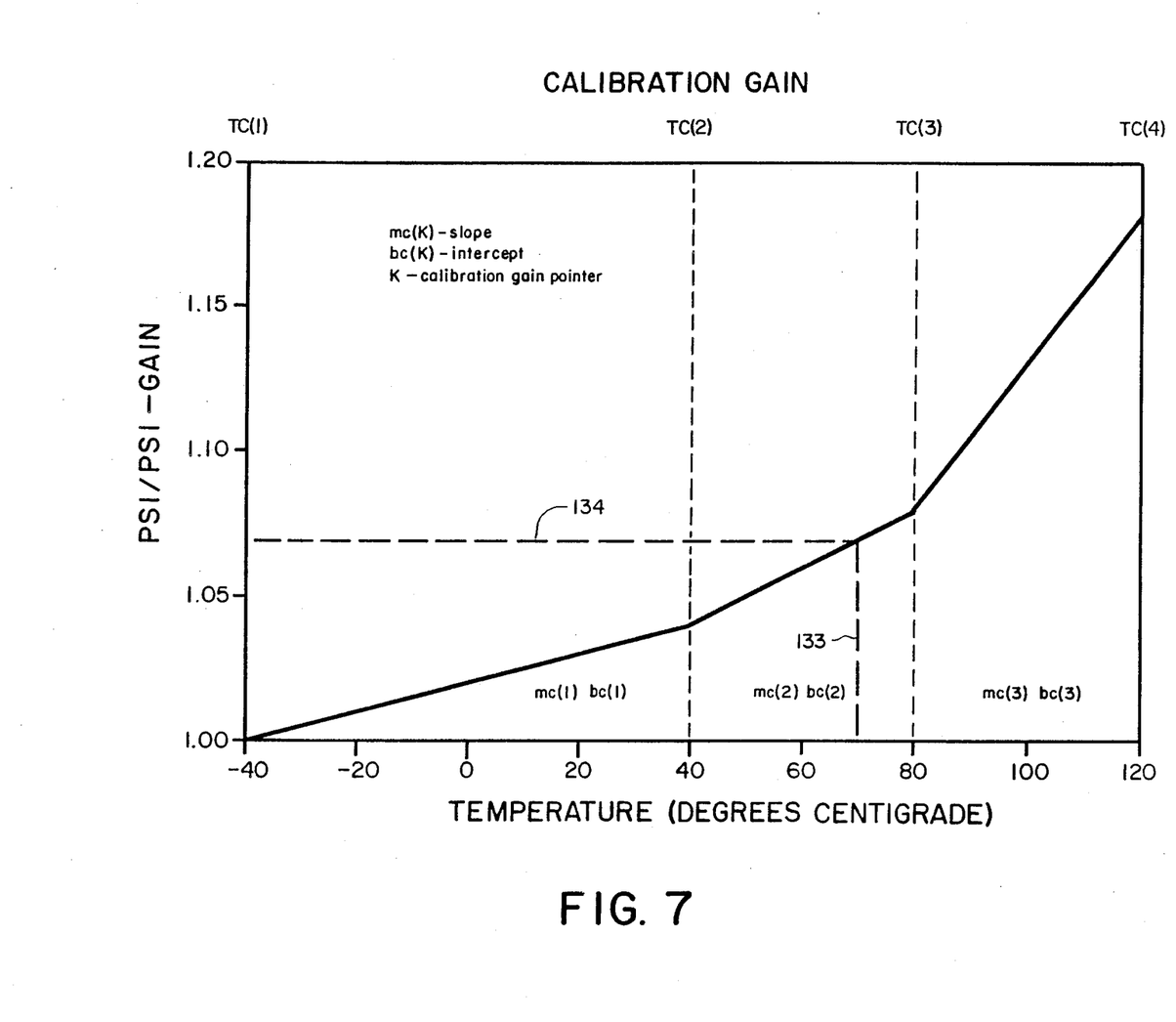

Attention will now be directed to the logic flow charts of FIG. 3, 4 and 6 and to the curves of FIGS. 5 and 7. The drawings illustrate the manner in which the various functions can be implemented in software and programmed into microcomputer circuitry. Of course, the microcomputer circuitry will respond to a variety of different parameters and variables in controlling the continuously variable transmission so its complete program would be substantially greater than that shown in FIGS. 3, 4 and 6. Only those portions and subroutines of the complete program are illustrated which deal with the present invention. Turning to FIG. 3, in cycling through a cycle or iteration of the program the IC flag is initially set as indicated by block 101, the term "IC" meaning initial condition. This is the condition where the integrator and setpoint filter are given initial values when first entering the closed loop. The open loop duty cycle U1P, which is a function of the setpoint $P_{LSET}$ and the fluid temperature, is then determined in accordance with block 102. The duty cycle selection of block 102 is illustrated in greater detail by the subroutine of FIG. 4 and the three duty cycle/setpoint segment curves of FIG. 5, each of which curves plots the duty cycle as a function of line pressure setpoint at a different fluid temperature, temperature TO(2) being greater than temperature TO(1) and temperature TO(3) being higher than temperature TO(2). It will be recalled that to obtain a desired setpoint pressure, the required duty cycle increases as the temperature increases due to the characteristics of regulator 74. Only three curves are shown in FIG. 5 for illustrative purposes. A total of six curves are employed to cover the entire temperature range over which the fluid is likely to vary; the exact number of curves required is a function of the desired accuracy.

The curves of FIG. 5 are stored in a look-up table in conventional slope-intercept form. Each curve is initially determined based on the worst case duty cycle/line pressure specification of the regulator, and is then converted to a series of straight line portions or segments extending between various pressure breakpoints. It will be assumed that minimum duty cycle detector 97 will ensure that the duty cycle will never drop below 20%. Hence, all three curves are the same (zero slope) from zero psi or PL(1) to the next pressure breakpoint PL(2), approximately 60 psi. Between breakpoints PL(2) and PL(3) or 100 psi, each of the curves has a different slope mo and a different intercept bo on the ordinate or duty cycle axis. These slopes and intercepts are stored in memory, as are the slopes and intercepts for the remaining segments of each curve. Of course, employing only six curves at six spaced-apart temperatures and then using the slope-intercept form of storage requires considerably less memory capacity than attempting to store the duty cycle required to produce every line pressure setpoint and at every different possible fluid temperature.

An understanding of the flow chart of FIG. 4, which relates to the graph of FIG. 5, may most easily be accomplished by considering a specific example. Assume that the desired line pressure setpoint is 125 psi and that the temperature of the fluid at that time lies between the temperature TO(2) and temperature TO(3). This is indicated by point 103 in FIG. 5. In executing the subroutine of FIG. 4, the pressure pointer I and the temperature pointer J are both initialized, as illustrated by instruction or operation block 104, to 1, namely the pressure pointer I is established at the first breakpoint PL(1) and the temperature pointer is established at temperature TO(1) Thereafter, decision block 105 determines whether the setpoint $P_{LSET}$ (125 psi) lies between zero pressure PL(1) and pressure PL(2) or 60 psi. Since the answer is NO, the pressure pointer I will be incremented from 1 to 2, according to instruction block 106. With I now being 2, block 105 will inquire as to whether $P_{LSET}$ is between PL(2) and PL(3) or 100 psi. Since the answer will again be NO, pointer I will be incremented to 3 by block 106 and block 105 will ask whether $P_{LSET}$ is greater than PL(3) but less than PL(4) or 150 psi. The answer will now be YES and the program will step to decision block 107 to inquire whether the prevailing fluid temperature is greater than TO(1) but less than TO(2). Since it is not, in the assumed example, block 108 increments pointer J from 1 to 2 and block 107 determines whether the fluid temperature lies between TO(2) and TO(3). Since it does (as indicated by point 103), instruction block 109 will be entered and two duty cycles U1 and U2 will be calculated, U1 from the curve below the temperature and U2 from the curve above.

Specifically, since I will now be 3 and J will be 2, U1 will be equal to mo(3,2), namely the slope of the segment of the TO(2) curve between PL(3) and PL(4), multiplied by $P_{LSET}$ or 125 psi, plus bo(3,2) which is the duty cycle where the segment, if extended, would intercept the duty cycle axis. In similar fashion, U2 is calculated by multiplying mo(3,3), the slope of the segment of the TO(3) curve between PL(3) and PL(4), and $P_{LSET}$, and adding bo(3,3), the duty cycle where the segment would intercept the ordinate. The specific values calculated for duty cycles U1 and U2 by these algorithms can be found in FIG. 5 by following the dashed construction lines 111 and 112. As indicated, U1 will be around 44% and U2 will be approximately 51% After the calculations of U1 and U2 in block 109, decision block 114 is entered to determine whether U1 (44%) is greater than U2 (51%). Since it is not, duty cycle U2 will be selected and will be represented by signal U1P, as shown by block 115. In the event that U2 is less than U1, block 116 would be entered to select duty cycle U1 for U1P. Usually, U2 will be greater than U1, but with some pressure regulators and at some temperatures this may not be the case. In any event, the higher duty cycle will always be selected to ensure that there is always more line pressure than is called for by the setpoint. Thus, the open loop duty cycle is determined from the look-up table by employing, when the temperature lies between two adjacent curves, the curve that will result in the higher line pressure. This is a salient feature of the invention.

Returning to the flow chart of FIG. 3, now that the open loop duty cycle schedule is selected in accordance with block 102, decision block 118 is entered to determine whether the line pressure control system is in the closed loop mode. Assuming that the transmission is in the start mode and the clutch is not yet locked up, the clutch input and output speeds therefore being different, the NO exit of block 118 will be followed to block 119 which sets the IC flag if it is not already set, after which instruction block 121 is entered to make duty cycle U3P equal to U1P, which is then sent to block 122 to control the PWM signal generator and impose the selected duty cycle on the PWM signal.

After completing the cycle or iteration of the subroutine of FIG. 3, the microcomputer circuitry cycles back, and block 102 is re-entered, to execute the next iteration. Assuming that the setpoint does not change, the same sequence of steps will be followed during each iteration until the control system is switched to its closed loop mode. When this occurs the YES exit of block 118 will be followed to decision block 123 and, since the IC flag is set, instruction block 124 is entered to place integrator 91 in its initial condition, namely the output of the integrator is set to zero and signal e2P is given a previous value of zero. The letter n designates the current value and n−1 represents the value during the previous iteration. Thereafter, block 125 initializes filter 94, making the previous value (n−1) of signal $P_{LSF}$ equal to the present value of $P_{LSET}$. The IC flag is then reset (block 126) and the calibration gain block 127 is entered to determine the factor by which the clutch pressure has to be multiplied to calculate the inferred line pressure, which is the same as the actual line pressure, thereby compensating for the pressure drop, due to leakage, in valve assembly 78 when the clutch is fully engaged.

The function of block 127 ma be broken down into the subroutine of FIG. 6, an understanding of which requires reference to the segment curve of FIG. 7, which plots the ratio of the actual line pressure relative to the clutch pressure on the ordinate axis (which ratio is the gain factor), when the clutch is locked up, versus the prevailing fluid temperature on the abscissa axis. The segment curve of FIG. 7 is also stored in a look-up table in slope-intercept form, each straight-line portion or segment of the curve being stored by storing its slope and its intercept with the ordinate axis.

To explain the operation of the calibration gain function, it will be assumed, by way of example, that the fluid temperature is approximately 70° Centigrade. As shown in FIG. 6 (block 128), at the beginning of the subroutine the calibration gain pointer K is initialized to 1, after which block 129 inquires as to whether the temperature (70°) is between TC(1) or −40° and TC(2) or 40°. Since the answer will be NO, operation block 131 increments the calibration gain pointer K to 2 and block 129 then questions whether the temperature lies between TC(2) or 40° and TC(3) or 80°. Since 70° falls in that bracket, the calibration gain interpolation block 132 will be entered and the gain will be calculated by the indicated algorithm. In the assumed example, mc(2), namely the slope of the segment from TC(2) to TC(3), will be multiplied by 70°, to which will be added bc(2), or the ratio where the segment, when extended, intercepts the ordinate axis. The results of this calibration are indicated by construction lines 133 and 134 in FIG. 7. In other words, for a temperature of 70°, the calibration gain ($C_{GAIN}$) will be 1.07. After computing the gain or ratio, block 135 multiplies the clutch pressure, as indicated by signal $P_{CLU}$, by the gain (1.07) to derive the signal $P_{LINE}$ representing the inferred line pressure which is substantially identical to the actual line pressure. The calibration gain function is also a salient feature of the invention because it permits the use of only one pressure transducer to control two different closed loop controllers.

Now that the signal $P_{LINE}$ is developed, the program returns to FIG. 3 and operation block 136 is entered to compute the error signal e1P. Thereafter, the setpoint filter block 137 calculates the current signal $P_{LSF}$. During the first iteration through the program, the setpoint filter will be in an initialized condition, caused by filter IC block 125, and $P_{LSF}(n-1)$ will be equal to $P_{LSET}(n)$. Accordingly, at this time $P_{LSF}(n)$ will be equal to $P_{LSET}(n)$ Assuming the program has been executed at least once, for subsequent iterations there will be a previous value for $P_{LSF}$ and block 137 will compute each present or current value by subtracting the previous value of $P_{LSF}$ (determined during the immediately preceding iteration) from the current value of $P_{LSET}$, and multiplying the answer by $-B_{LSF}$ (a constant which determines the filter bandwidth), to the product of which is then added the current value of $P_{LSET}$.

With signal $P_{LSF}$ now developed, setpoint trigger block 138 calculates the value of $D_{PSET}$, it being equal to the current value of $P_{LSF}$ minus the previous value. In this way the magnitude of $D_{PSET}$ represents the extent to which the setpoint is changing, and thus the speed at which the setpoint is varying. $D_{PSET}$ goes positive on an increase of $P_{LSET}$ and negative on a $P_{LSET}$ decrease. The term SRU means the setpoint rate upper or positive limit, while SRL refers to the setpoint rate lower or negative limit. Block 139 detects whether $D_{PSET}$ is greater, in a positive direction, than the setpoint rate upper limit, while block 141 decides whether $D_{PSET}$ is larger, in a negative direction, than the setpoint rate lower limit. If either limit is exceeded, block 142 effects reset of integrator 91, establishing the previous value of e2P at zero, thereby effectively switching the line pressure control system to its open loop mode to ensure that the line pressure will be as high as required to prevent belt slippage.

Thereafter, block 143 queries whether the duty cycle represented by signal U3P is less than the minimum allowable duty cycle, 20% in the illustrated embodiment. If so, the output of integrator 91 is held constant, in accordance with block 144, by forcing signal e1P to be zero so that the duty cycle will not drop any further. In effect, the integrator output is held constant when the line pressure decreases to a predetermined minimum level, since the line pressure is directly related to the duty cycle.

Block 145 indicates the operation of integrator 91, the output signal e2P being determined by multiplying the current value of e1P by a gain factor KLIP and by then adding the prevous value of e2P The gain factor KLIP determines the speed at which the closed loop line pressure controller responds to changes.

Blocks 146–149 depict the operation of integrator limiter 92. If signal e2P is less than a lower limit e2L, the signal will be established at that lower limit by block 147, and if signal e2P exceeds an upper limit e2U, block 149 forces the signal to remain at the upper limit. Block 151 indicates that signal U2P will be equal to e2P, as limited by the limiting function. Thereafter, in accordance with block 152, the duty cycle U3P is made equal to the sum of duty cycles U1P and U2P.

While particular embodiments of the invention have been described, modifications may be made, and it is intended in the appended claims to cover all such modifications as may fall within the true spirit and scope of the invention.

We claim:

1. A line pressure control system for controlling the line fluid pressure in a continuously variable transmission, in which fluid under line pressure is controlled to produce an adjustable clutch fluid pressure for operating a clutch to transfer drive torque from an engine and through the transmission to an associated drivetrain, including a pressure transducer operable to sense the clutch pressure applied to the clutch, and having a closed loop clutch controller which responds to the sensed clutch pressure to effect closed loop control of the clutch, said control system comprising:
   a closed loop line pressure controller, including the closed loop clutch controller, which responds to the clutch pressure sensed by the pressure transducer after the clutch is fully applied and is locked up, and becomes operable to effect closed loop control of the line pressure to a desired setpoint.

2. A line pressure control system according to claim 1, wherein said pressure transducer provides a feedback signal within said closed loop clutch controller and a feedback signal within said closed loop line pressure controller.

3. A line pressure control system according to claim 1, in which the closed loop line pressure controller includes an open loop line pressure controller, wherein the line fluid pressure is regulated, when the clutch is not fully engaged, in response to the desired line pressure setpoint by means of the open loop line pressure controller.

4. A line pressure control system according to claim 3, wherein the resulting line pressure, during open loop operation, is higher than it would be under closed loop control and is higher than the level called for by the desired setpoint.

5. A line pressure control system according to claim 3, including means for sensing the temperature of the transmission fluid, and wherein said open loop line pressure controller also operates in response to the sensed fluid temperature.

6. A line pressure control system according to claim 5, including a line pressure regulator having a characteristic which changes with temperature, wherein the line pressure is varied by controlling the operation of the line pressure regulator, and wherein the operation of said regulator is made a function of the sensed fluid temperature in order to compensate for the temperature effects and maintain a line pressure that is immune to temperature changes.

7. A line pressure control system according to claim 3, including a line pressure regulator controlled by a pulse width modulated signal having an adjustable duty cycle, the line pressure being determined by, and being directly proportional to, the signal's duty cycle, and wherein the open loop line pressure controller selects an open loop duty cycle for the pulse width modulated signal that will result in a line pressure higher than that called for by the desired line pressure setpoint.

8. A line pressure control system according to claim 7, wherein the open loop duty cycle is determined from a look-up table that is biased to always yield a greater line pressure than that commanded by the setpoint.

9. A line pressure control system according to claim 7, wherein said closed loop line pressure controller, when operable, effectively lowers the duty cycle imposed by the open loop controller to the extent necessary to establish the line pressure at the level dictated by the desired setpoint.

10. A line pressure control system according to claim 7, wherein the duty cycle required to produce a desired line pressure depends on the temperature of the transmission fluid due to characteristics of said regulator which vary with temperature, wherein a duty cycle/setpoint segment curve for each of several different discrete temperatures is effectively stored in a look-up table in said open loop controller, and wherein the open loop duty cycle is determined from the look-up table by selecting the two temperature curves bracketing the current fluid temperature, calculating the resultant duty cycles, and selecting the larger of the two duty cycles, so that the line pressure resulting from the open loop duty cycle will always be higher than the desired line pressure called for by the setpoint.

11. A line pressure control system according to claim 1, wherein the closed loop clutch controller includes a clutch control valve assembly to which fluid under line pressure flows and from which fluid under clutch pressure flows to the clutch; the valve assembly having undesired leakage, which varies directly with the temperature of the transmission fluid, such that the clutch pressure will be slightly lower than the line pressure when the clutch is fully engaged and is locked up; and including means, responsive to the temperature of the transmission fluid, for effectively converting the clutch pressure, sensed by said pressure transducer, to an inferred line pressure which equals the actual line pressure and is used to effect closed loop line pressure control to the desired setpoint.

12. A line pressure control system according to claim 11, wherein the inferred line pressure is calculated in a calibration gain function by employing a look-up table in which is effectively stored a segment curve of the ratio of the actual line pressure relative to the clutch pressure, when the clutch is locked up, versus the fluid temperature, the inferred line pressure being determined by multiplying the clutch pressure by the ratio corresponding to the current fluid temperature.

13. A control system for a continuously variable transmission having a primary pulley and a secondary pulley, a belt intercoupling the pulleys, a primary sheave chamber in the primary pulley for admitting and discharging fluid to change the effective pulley diameter and correspondingly change the transmission ratio, a secondary sheave chamber in the secondary pulley for admitting and discharging fluid to maintain tension in the belt as the transmission is driven, a fluid-actuated clutch operable to transfer drive torque from the secondary pulley to an associated drivetrain, which clutch includes a clutch chamber for receiving fluid to apply the clutch and from which fluid is discharged to release the clutch, comprising:

means for supplying fluid under line pressure to the secondary sheave chamber;

a closed loop clutch controller, including a pressure transducer, for employing the fluid under line pressure to supply a controlled clutch fluid pressure to the clutch chamber, the pressure transducer sensing the clutch pressure and providing a feedback signal within the clutch controller;

and control means, including the closed loop clutch controller, for responding to a desired line pressure setpoint and to the clutch pressure sensed by the pressure transducer, when the clutch is fully applied and is locked up, to effect closed loop control of the line pressure to the setpoint, the pressure transducer providing a feedback signal within the control means.

14. A line pressure control system for controlling the line fluid pressure in a continuously variable transmission, including a line pressure regulator for varying the line pressure, which line pressure regulator is controlled by a pulse width modulated signal having an adjustable duty cycle, the line pressure being determined by, and being directly proportional to, the signal's duty cycle, and where, due to characteristics of the regulator which vary with temperature, the duty cycle required to produce a desired line pressure depends on the temperature of the transmission fluid, said control system comprising:

means for effectively storing, in a look-up table, a duty cycle/desired setpoint segment curve for each of several different discrete temperatures;

and means for determining a duty cycle for the pulse width modulated signal, which means selects the two temperature curves bracketing the current fluid temperature, calculates the resultant duty cycles, and selects the larger of the two duty cycles, thereby to provide a line pressure that will always be higher than a desired set point pressure.

15. A line pressure control system for controlling the line fluid pressure in a continuously variable transmission, comprising:

an open loop controller for establishing the line pressure at a level higher than that called for by a desired line pressure setpoint;

and a closed loop controller, including the open loop controller, for effectively lowering the line pressure so that it will be equal to the setpoint.

16. A line pressure control system according to claim 15, wherein said closed loop controller includes a pressure transducer from which the actual line pressure may be determined, and wherein the pressure transducer is also included in another closed loop control to perform another function in the transmission.

17. A line pressure control system according to claim 15, wherein the desired line pressure setpoint varies as conditions change, wherein for stable operation said closed loop controller responds only to relatively slow changes of the setpoint to establish and to hold the line pressure at the level commanded by the setpoint, and wherein said closed loop controller is made ineffective in response to relatively fast changes of the setpoint so that the line pressure will be determined only by said open loop controller and will be greater than the level called for by the setpoint.

18. A line pressure control system according to claim 17, including detecting means for detecting relatively fast changes of the setpoint, and means responsive to said detecting means for effectively disabling said closed loop controller so that only said open loop controller operates during such fast changes.

19. A line pressure control system according to claim 17, wherein the actual line pressure is effectively subtracted from the desired line pressure setpoint in said closed loop controller to produce an error signal which is then integrated in an integrator to provide a signal for lowering the line pressure from the level established by said open loop controller, and wherein the integrator is reset in response to fast changes of the setpoint so that the error signal will have no effect on the line pressure.

20. A line pressure control system according to claim 19, including means for holding the output of said integrator constant when the line pressure drops to a predetermined minimum level.

* * * * *